Aug. 11, 1970
R. B. McCUNE
3,524,103
CIRCUIT FOR DETECTING ANGULAR VELOCITY VARIATIONS
BETWEEN TWO ROTATING MEMBERS
Filed Sept. 7, 1967
2 Sheets-Sheet 1
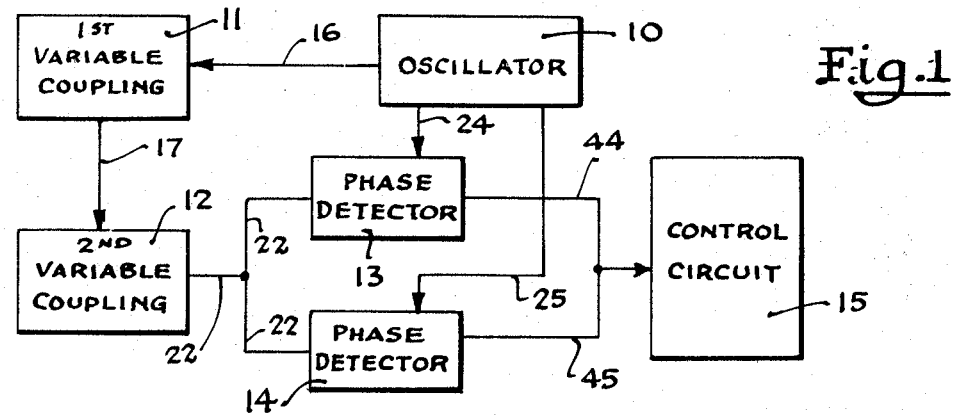
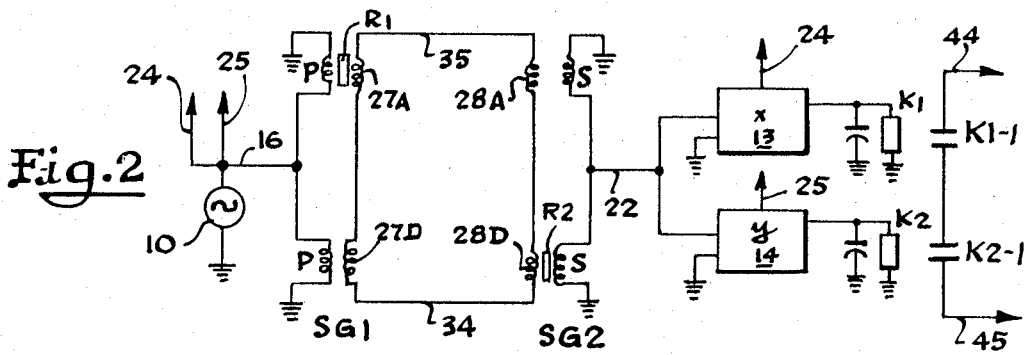
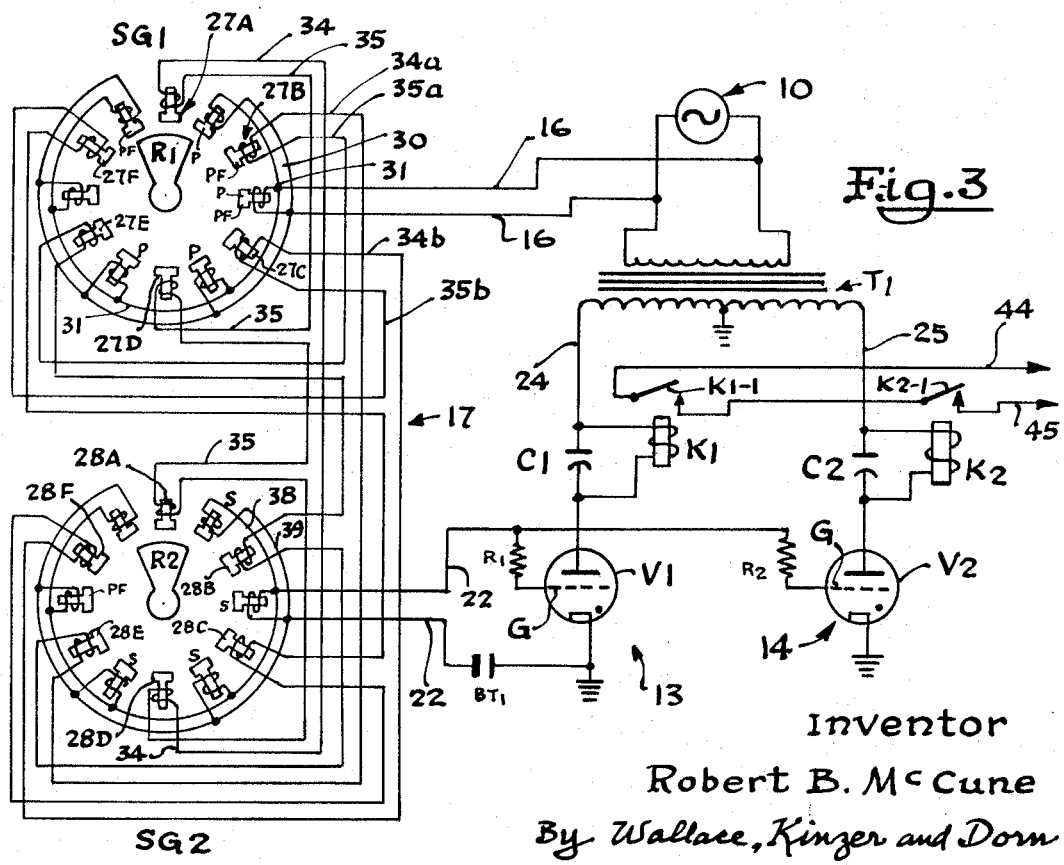
Inventor
Robert B. McCune
By Wallace, Kinzer and Dorn
Attorneys

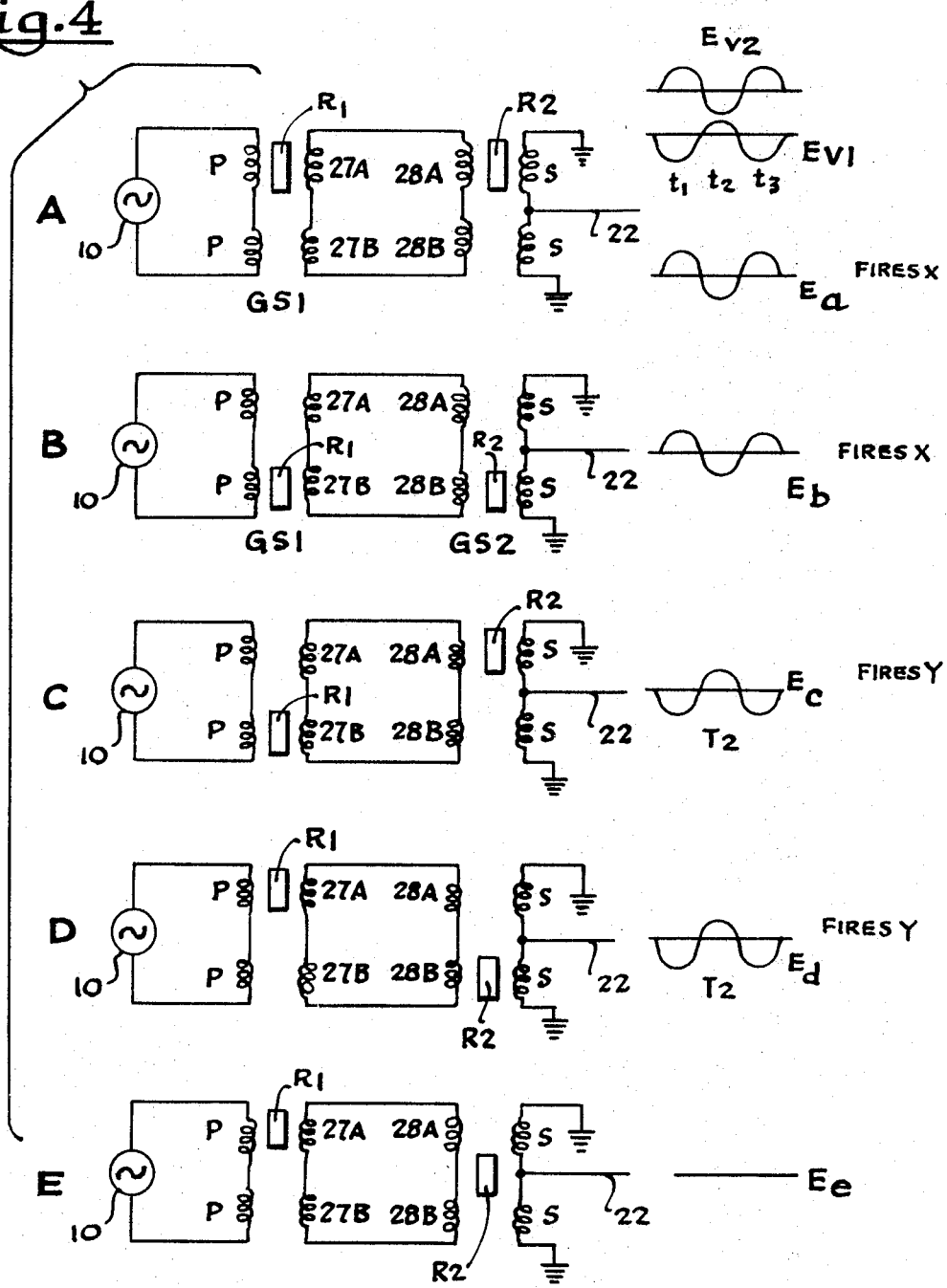

3,524,103
CIRCUIT FOR DETECTING ANGULAR VELOCITY VARIATIONS BETWEEN TWO ROTATING MEMBERS
Robert B. McCune, Allendale, N.J., assignor to Abex Corporation, New York, N.Y., a corporation of Delaware
Filed Sept. 7, 1967, Ser. No. 666,022
Int. Cl. H02p
U.S. Cl. 317—6     4 Claims

ABSTRACT OF THE DISCLOSURE

Apparatus for detecting variations in angular velocity between two wheels or other rotating members comprising a constant-frequency A.C. reference signal generator, first and second variable transformers and a phase rate detector. Each transformer includes a plurality of primary windings disposed in an annular array, a corresponding plurality of secondary windings interspersed equally in the array, and a coupling rotor rotated around the array by one of the wheels to field-couple each primary winding, successively, to the adjacent secondary windings. The primary windings of the first transformer are energized with the reference signal, the secondary windings of the first transformer are connected to the primary windings of the second transformer, and the secondary windings of the second transformer are connected together to an output circuit in turn connected to the phase rate detector, which compares the output of the second transformer with the reference signal to detect excessive changes in the relative rotational speeds of the two wheels.

---

This invention relates to control apparatus and more particularly to control apparatus for detecting variations in angular velocity between two or more rotating elements.

The present invention is primarily directed to an electrical system for the detection of variations between the rotational speeds of two or more shafts, wheels, or the like. The present invention is of particular utility in the railroad industry for detecting variations in rotational speed of car wheels on one axle of a locomotive relative to the rotational speed of the car wheels of another axle for the same locomotive. For instance, during braking of a locomotive, it sometimes occurs that the wheels on one axle are still turning while the wheels on another have stopped turning and are skidding along the railroad rails. Another example, where there is a likelihood of a difference in angular velocity between car wheels of a locomotive, is during the initial start up of a locomotive pulling a heavy load where one set of wheels begins slipping. If a difference in relative rotation is detected, remedial action may be instituted.

The present invention is directed to an improvement over control apparatus of the general kind disclosed in U.S. Pat. Nos. 2,232,715, 2,782,872 and 2,320,809, for detecting variations in relative speed of two wheels or axles of a truck of railway equipment; and is an improvement over control apparatus of the kind disclosed in U.S. Pat. Nos. 2,443,437 and 2,513,222, wherein variations in relative speed of one or more motor driven shafts is detected and is used to initiate remedial action. In all of the above listed patents, each of the rotating shafts or elements is connected to a rotor having commutator-like segments engageable by brushes for completing electrical circuits to cause operation of a common control circuit in response to relative rotary motion between the rotating shafts. Such brushes are subject to wear and malfunctioning; accordingly, an object of the present invention is a new and improved apparatus for detecting variations of relative speed of rotative elements in which such brushes and commutator segments are eliminated.

A more specific object of the invention is the detection of a relative change in speed of two or more rotating elements by generating a phase signal which changes phase relative to the phase of a reference signal of a given frequency with changes in relative speeds of the rotating elements.

A still further object of the invention is a detection of a change in phase of output signals from rotary transformers coupled to rotary elements as compared to the phase of a standard or reference phase signal.

A general object of the invention is a new and improved apparatus for detecting variations in the relative speed of two or more rotative elements, which apparatus is inexpensive to manufacture and trustworthy in operation.

Other and further objects of the present invention will be apparent from the following description and claims and are illustrated in the accompanying drawings which, by way of illustration, shows a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention.

In the drawings:

FIG. 1 is a block diagram illustration of a preferred embodiment of the present invention;

FIG. 2 is a schematic diagram of the invention;

FIG. 3 is a circuit diagram of the preferred embodiment of the present invention; and FIG. 4 is a diagram illustrating different phase relationships occurring upon relative movement between rotors of the rotary transformer devices of FIG. 3.

Referring now to the drawings and more particularly to FIG. 1, there is illustrated an electrical control system for detecting excessive variations in angular velocity between first and second rotating elements such as a rotating shaft or the like, which in the preferred embodiment of the invention, are wheel axles of a railroad locomotive. The electrical control system includes a reference signal generator in the form of an oscillator 10 for generating a reference signal of a given frequency which is applied to a first variable coupling means 11 by means of leads 16. The variable coupling means is mechanically connected (in a manner not shown) to a rotatable shaft or axle. The first variable coupling means 11 produces a plurality of intermediate electrical signals of a given frequency representative of the angular position of its rotating element. A second variable coupling means 12 is likewise mechanically connected to a second rotating element which is an axle shaft or the like. The second variable coupling means 12 receives the intermediate electrical signals via cable 17 and the coupling means 12 produces an output signal of the given frequency that varies in phase in accordance with the relative angular positions of the respective rotating elements. The output signal from the second variable coupling means 12 goes to a phase rate detection means including detectors 13 and 14 which are also coupled to the reference signal generator 10 by leads 24 and 25. The phase detectors 13 and 14 are connected to a control circuit 15 by leads 44 and 45, respectively; and the phase detectors 13 and 14 develop a control signal in response to variations in the rate of change of phase of said output signal from lead 22 relative to said reference signal in excess of a predetermined rate.

The preferred form of coupling means 11 and 12 are hereinafter referred to in FIGS. 2–4 as signal generators SG1 and SG2. The respective signal generators SG1 and SG2 are, in the preferred embodiment of the invention, rotary transformers of identical construction each having a respective rotor R1 and R2. Each of the rotors R1 and R2 is mechanically coupled, by cables, gears or the like, to a rotating shaft or element such as the axle of a locomotive. Hence, each of the rotors R1 and R2 rotates at a speed which is representative of the speed of its respectively connected axle (not shown).

As will be explained in greater detail hereinafter, the phase detectors 13 and 14 are both operated simultaneously only after a predetermined amount of change in the phase of the output signal from the signal generator SG2. On the other hand, as long as the output of the signal generators SG2 remains in a continuing phase relationship with the reference signal from oscillator 10, only one of the phase detectors 13 or 14 is operating. Changes in phase are generated when one rotor R1 or R2 moves relative to another indicating a change in rotational speed of their respective wheels, axles or the like.

The signal generators SG1 and SG2 are preferably rotary transformers of identical construction each having twelve transformer windings each of which is wound about a stator pole having a pole face PF. In the preferred embodiment of the invention illustrated in FIG. 3, each of the rotors R1 and R2 subtends an arc of 15° and is separated from its adjacent poles by a spacing of 15°. When a rotor is centered over one pole face PF, as shown in FIG. 3, the rotor R1 or R2 bridges three poles or windings. When a rotor R1 or R2 is centered between two poles, the rotor R1 or R2 bridges only two poles. Preferably, the rotors R1 and R2 are formed of laminated iron. A small air gap exists between the pole faces PF and their respective rotors R1 and R2 to complete a magnetic path without physical contact between a rotor and a pole face PF.

Alternate ones of the windings of the signal generator SG1 constitute primary windings and are designated by the reference character P. The windings P of signal generator SG1 have the reference signal from the signal generator 10 impressed thereon over leads 16. As best seen in FIG. 3, common conductors 30 and 31 interconnect the windings of each of the primary windings P so that the input signal from the oscillator 10 is simultaneously present at all the primary windings P. The signal generator SG1 has interspersed between adjacent primary windings P, a series of secondary windings 27A–27F which constitute the secondary windings of the rotary transformer SG1. Each of the secondary windings 27A–27F of rotary transformers SG1 are connected by leads 34, 35; 34a, 35a; and 34b, 35b, to primary windings 28A–28F of the rotary transformer SG2, FIG. 3. Thus, the signal induced in any of the secondary coils 27A–27F of the signal generator SG1 being bridged by the rotor R1 is simultaneously impressed on correspondingly connected primary windings 28A–28F of the signal generator SG2.

To reduce the amount of wiring, each of the secondary windings in the signal generator SG1 is connected to its diametrically opposite secondary winding; similarly, the same pair of windings are connected to the corresponding designated windings 28A–28F of the second signal generator SG2. For example, in rotary transformer SG1, the secondary winding 27A has a pair of leads 34 and 35 connected thereto with the lead 35 going to the diametrically opposed winding 27D of rotary transformer SG1; then to the primary winding 28A of signal generator SG2, and then the lead 34 goes to primary winding 28D in signal generator SG2. Secondary windings S of the signal generator SG2 are connected to each other by common conductors 38 and 39. Common conductors 38 and 39 are in turn connected to leads 22 to supply the output signal from signal generator SG2 to the phase detectors 13 and 14.

When the rotors R1 and R2 are rotating at the same relative speed, a signal of a predetermined phase is being repetitively generated and supplied from the signal generator SG2 to phase detecting thyratron tubes V1 and V2 in the respective phase detectors 13 and 14. More particularly, secondary windings S of signal generators SG2 are interconnected by leads 22 to supply the output voltage to the grids G of thyratrons V1 and V2.

The thyratrons V1 and V2 receive their anode voltage from the oscillator 10 through a center tapped transformer T1 which divides the alternating current signal to make one of the anode voltages positive and the other negative. That is, with the center tapped transformer T1, the anode voltage appearing at any instant of time over the lead 24 is always of opposite polarity from the voltage which appears over the lead 25. Because the thyratrons V1 and V2 need a positive anode voltage to fire, it is seen that it is impossible for both of the tubes V1 and V2 to fire simultaneously. The grid voltage over leads 22, on the other hand, appears simultaneously at both grids G of the thyratrons V1 and V2 so that which of the thyratrons V1 and V2 fires is dependent upon the anode voltage from the reference signal. As will be explained in greater detail hereinafter, the same tube V1 or V2 fires repetitively so long as the rotors R1 and R2 remain at a fixed rotational speed relative to one another and thereby maintain the same phase relationship to the anode voltage supplied from the voltage divider T1. However, as also explained in detail hereinafter, a predetermined amount of change in relative speeds of the rotors R1 and R2 causes a firing of the opposite thyratron (V1 or V2) from that which has previously fired. The successive firing of both thyratrons V1 and V2 results in a concurrent energization of their respective relays K1 and K2 and thereby results in a concurrent closing of their respective relay contacts K1–1 and K2–1 to close the control circuit output leads 44 and 45. Each of the relays K1 and K2 is a time relay in that the relay K1 or K2 remains energized by its respectively associated capacitor C1 or C2 for a predetermined period of time. Each of the capacitors C1 and C2 holds its respective relay energized for a period of time in excess of one-half cycle of the alternating signal from the oscillator 10 so that both relays K1 and K2 and thyratrons V1 and V2 may be simultaneously operated.

For example, if the thyratron tube V2 is being repetitively fired, the relay K2 remains energized continuously between successive firings of thyratron V2 because of its energization by its time delay capacitor C2. Assuming the thyratron V2 is repetitively firing, and there occurs a sufficient relative change in position of the rotors R1 and R2, the thyratron V1 fires. Since the firing of the thyratron V1 immediately followed the firing of the thyratron V2, both relays K1 and K2 are simultaneously energized to complete the control circuit through their now closed contacts K1–1 and K2–1.

To facilitate a description of detection of a change in signal phase due to change in relative rotational speeds, as reflected in changes in the relative positions of the rotors R1 and R2, there is illustrated, in FIG. 2, a schematic electrical diagram of the connection of the signal generators SG1 and SG2 to the phase detecting means 13 and 14 and to the signal generator 10. The rotor R1 of the signal generator SG1 is shown as being disposed between the windings P and 27A of signal generator SG1 and the rotor R2 is shown between the coils 28D and S of the signal generator SG2. The primary coils P of the signal generator SG1 are connected by the lead 16 to the oscillator 10, which would be typical of all the coils P of the signal generator SG1 and an inductance is set up in the coil 27A being bridged by the rotor R1. This secondary coil 27A of the signal generator SG1 is connected by leads 34 and 35 to impress its voltage on the primary coils 28A and 28D of the signal generator SG2. The coils 28D and S of signal generator SG2 are being bridged by the rotor R2 so that a voltage appears on the lead 22 going to the phase detectors 13 and 14.

In FIG. 4, five different relative relationships of the rotors R1 and R2 are illustrated, in examples designated A–E. The rotors R1 and R2 may be assumed to be in one of the positions shown at a given instant irrespective of whether or not the rotors R1 and R2 are rotating at the same speed or at different speeds. If the rotors R1 and R2 are rotating at sufficiently different speeds, they will move relative to one another from one position shown in examples A–E to another position shown in examples A–E. If the rotors R1 and R2 are rotating at the same speed they will be maintaining the relationship shown in one of the examples A–E. The variations in angular velocity of the rotors R1 and R2 must exceed a predetermined rate in order to afford a rate of change of phase of the output signal from the signal generator SG2 relative to the reference signal from the oscillator 10 before the phase detecting means 13 and 14 are effective to institute remedial action. This predetermined rate of change is exemplified by the changes in rotor positions from that of one example A–E to another example A–E in FIG. 4.

In the examples A–E of FIG. 4, it is assumed that the reference voltage from the oscillator 10 provides anode voltage for the tube V2 as shown by the curve $E_{v2}$, and provides anode voltage for the tube V1 as shown by the curve $E_{v1}$. The phase of the voltages $E_{v1}$ and $E_{v2}$ differs by 180° because of the connections to the transformer T1.

Referring now to Example A, in FIG. 4, assuming that the voltage curve $E_a$ represents the phase of the voltage generated with the rotors R1 and R2 maintaining the position shown in Example A, it will be seen that the voltage curve $E_a$ is in phase with the voltage curve $E_{v2}$, which illustrates the anode voltage being present at the tube V2. Thus, the anode voltage $E_{v2}$ at the tube T2 is positive at the times $t_1$ and $t_3$ when the grid voltage ($E_a$) is positive, causing the tube V2 to fire. The tube V1 does not fire because the anode voltage ($E_{v1}$) at the tube V1 is negative at the times $t_1$ and $t_3$ when the voltage output ($E_a$) of the transformers SG1 and SG2 is positive. As long as the rotors R1 and R2 rotate in this same angular relationship of Example A, the thyratron tube V2 will continue to fire through the twelve pole portions of a rotation, thereby maintaining its relay K2 continuously energized. The relay K2 is held energized for a time period in excess of that between firings by its capacitor C2 and, therefore, relay K2 remains energized continuously.

In the second Example B, the rotors R1 and R2 are assumed to be maintaining the constant relationship shown wherein the rotor R1 is disposed between a pair of coils P and 27B in the poles 28B and S. The output curve ($E_b$) is the same as the curve ($E_a$), therefore, only the thyratron tube V2 would be firing. No remedial action will be instituted so long as the axles and the rotors R1 and R2 maintain the same relationship relative to one another in Example B.

In Example C, the rotor R1 is disposed between the coil P and a secondary coil 27B for signal generator SG1 while the rotor R2 is disposed to bridge the coils 28A and S. The output signal $E_c$ is 180° out of phase from the signals $E_a$ and $E_b$ of Examples A and B. Since the anode voltage $E_{v1}$ for the thyratron V1 is also positive at the time $t_2$, the tube V1 fires. If the rotors R1 and R2 maintain a constant relationship as seen in FIG. 3, the tube V1 continues firing without the output circuit being completed.

However, if a change in relationship to the rotors R1 and R2 occurs, as from Example A to Example C, due to one of the rotors R1 or R2 moving angularly relative to the other rotor, then thyratrons V1 and V2 would be energized successively. Because of the capacitors C1 and C2, the relays K1 and K2 would be energized concurrently to have their contacts K1 and K2 closed to complete the control circuit 15 for initiating remedial action.

In Example D, the rotor R1 is between the windings P and 27A, and the rotor R2 is disposed between the windings 28B and S. The output signal $E_d$ would be that shown in FIG. 4, which is of the same phase as signal $E_c$.

The output signal $E_d$ is positive at the time period $t_2$ which is the time period that the tube V1 has its plate voltage $E_{v1}$ at a positive value. Consequently, the tube V1 is fired.

The tube V1 continues to fire so long as the rotors R1 and R2 maintain the relationship shown in Example D.

It will be appreciated that movement of either rotor R1 or R2 from one given position of Example A, B, C or D, to another of the positions in Examples A, B, C and D results in successive firing of the tubes V1 and V2 thereby causing a concurrent operation of relays K1 and K2 to those contacts K1–1 and K2–2 and thereby completing the output circuit over leads 44 and 45.

Example E of FIG. 4, illustrates a special condition wherein the rotor R2 has moved only slightly out of phase through a slight distance indicating a change in relative speed less than the rate needed to effect a change in phase of a signal. In this case, the output voltage $E_e$ is zero; and in this example, neither of the tubes V1 or V2 receive a positive grid voltage to cause the firing of a tube.

From the foregoing, it will be seen that the present invention provides an apparatus for generating changes in phases of signals with variations in speeds of rotative elements such as wheel axles. The present invention eliminates brushes and commutators heretofore employed and the attendant disadvantages therefrom.

Hence, while preferred embodiments of the invention have been described and illustrated, it is to be understood that they are capable of variation and modification.

I claim:

1. A control apparatus for detecting excessive variations in angular velocity between first and second rotating elements, comprising:

a reference signal generator for generating an A.C. reference signal of given frequency;

first variable coupling means, comprising a plurality of first input elements disposed in a first annular array and all electrically connected to said reference singal generator, a corresponding plurality of first output elements interspersed equally with said first input elements in said first annular array, and a first coupling rotor aligned with said first annular array and connected to said first rotating element for rotation around said first array at a velocity determined by the angular velocity of said first rotating element, said first coupling rotor field-coupling each said first input element successively to the adjacent first output elements as it rotates, thereby producing, on said first output elements, a plurality of intermediate signals of said given frequency representative of the angular position of said first rotating element;

second variable coupling means comprising a corresponding plurality of second input elements disposed in a second annular array and electrically connected to said first output elements of said first variable coupling means, a corresponding plurality of second output elements all electrically connected to an output circuit and interspersed equally with said second input elements in said second annular array, and a second coupling rotor aligned with said second annular array and connected to said second rotating element for rotation around said second array, said second coupling rotor field-coupling each said second input element successively to the adjacent second output elements as it rotates, thereby producing, on said output circuit, an output signal of said given frequency that varies in phase in accordance with the relative angular positions of said rotating elements;

and phase rate detection means, coupled to said reference signal generator and to said output circuit, for developing a control signal in response to variations in the rate of change of phase of said output signal relative to said reference signal in excess of a predetermined rate.

2. A control apparatus according to claim 1, in which each of said variable coupling means is a rotary transformer having primary windings as said input elements and secondary windings as said output elements.

3. The apparatus of claim 1 including divider means connected to said reference signal generator to divide said synchronous signal; said phase rate detection means receiving said divided signal from said dividing means, said phase rate detection means including a first control means for receiving said divided signal, and a second control means for receiving said divided signal, at least one of said control means having a sustained period of operation, and a control circuit operated by simultaneous operation of said first and second control means.

4. The apparatus of claim 2 wherein said phase rate detection means includes a pair of current carrying devices, each of said current carrying devices being connected to said output circuit of said second rotary transformer, and said phase rate detection means further includes slow-to-release relays operable by respectively associated first and second current carrying devices.

References Cited

UNITED STATES PATENTS 2,513,222   6/1950   Wilson _____ 317—5

LEE T. HIX, Primary Examiner

W. J. SMITH, Assistant Examiner

U.S. Cl. X.R.

340—268; 303—21; 324—69, 70